United States Patent [19]

Honda

[11] Patent Number: 4,643,704
[45] Date of Patent: Feb. 17, 1987

[54] POWER TRANSMISSION CHAIN

[75] Inventor: Shoichi Honda, Tokyo, Japan

[73] Assignees: Honda Giken Kogyo Kabushiki Kaisha, Tokyo; Daido Kogyo Kabushiki Kaisha, Ishikawa, both of Japan

[21] Appl. No.: 767,761

[22] Filed: Aug. 21, 1985

[30] Foreign Application Priority Data

Aug. 21, 1984 [JP] Japan .................. 59-173893
Aug. 21, 1984 [JP] Japan .................. 59-173894

[51] Int. Cl.$^4$ .............................................. F16G 1/24
[52] U.S. Cl. ................................................ 474/245
[58] Field of Search ............... 474/245, 238, 240, 242, 474/244, 245, 201, 214, 215

[56] References Cited

U.S. PATENT DOCUMENTS 3,916,709 11/1975 Steuer et al. .................. 474/242
4,507,106 3/1985 Cole, Jr. ...................... 474/238 X Primary Examiner—Stephen J. Novosad
Assistant Examiner—Thuy M. Bui
Attorney, Agent, or Firm—Irving M. Weiner; Joseph P. Carrier; Pamela S. Burt

[57] ABSTRACT

A power transmission chain includes a plurality of link plate units each composed of a pair of outer link plates and a plurality of inner link plates disposed inwardly of the outer link plates, a plurality of joint plates connecting the outer link plates and the inner link plates and coupling the link plate units in an endless loop pattern, and a plurality of power transmission blocks extending transversely across the link plates and supported by the inner link plates.

10 Claims, 5 Drawing Figures

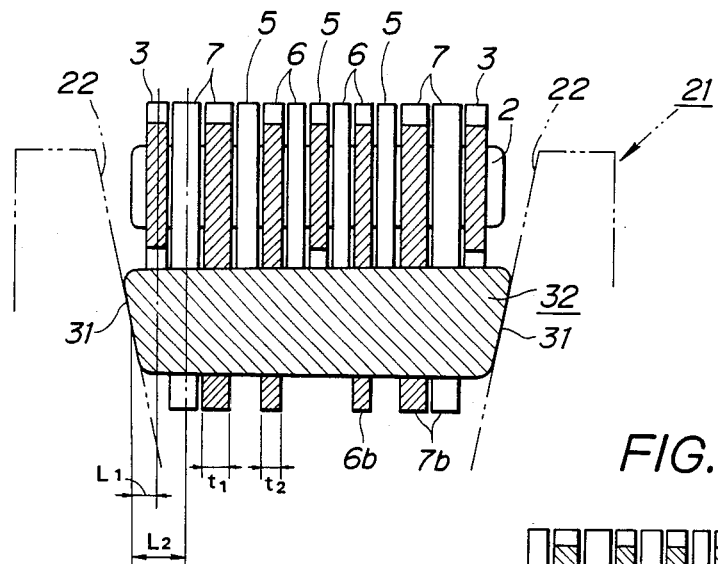
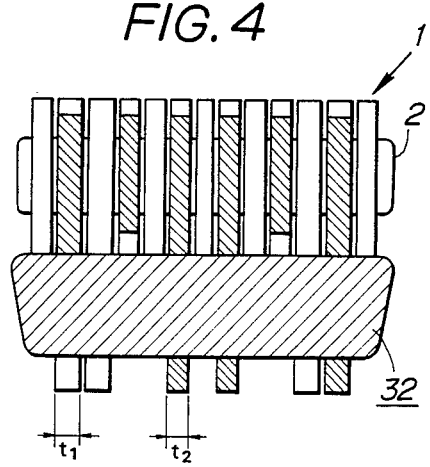
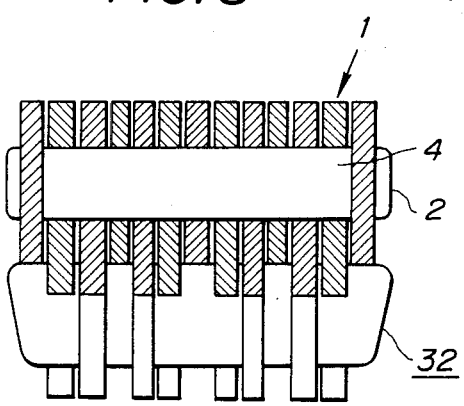

4,643,704

POWER TRANSMISSION CHAIN

BACKGROUND OF THE INVENTION

1. Field of the Invention

The present invention relates to a power transmission chain.

2. Discussion of Relevant Art

There have been known in the art power transmission chains comprising an endless series of link plates joined by joint pins, and supporting power transmission blocks having end surfaces for engaging in the groove in a sheave. In such power transmission chains, the power transmission blocks are supported by the outermost link plates. Therefore, the distances between the engaging end surfaces of the blocks and the outermost link plates that support them are so small that large loads will be imposed on the outermost link plates closest to the engaging block end surfaces when the power transmission chain engages the sheave. Since the edges of the joint pins are especially subject to localized stresses for the above reason, the conventional power transmission chain of the type described above has not been sufficiently durable.

SUMMARY OF THE INVENTION

In view of the foregoing drawback of the prior power transmission chains, it is an object of the present invention to provide a power transmission chain designed to reduce the loads on link plates closest to the engaging end surfaces of power transmission blocks at the time the power transmission blocks engage a sheave.

According to the present invention, a power transmission chain includes a plurality of link plate units each composed of a pair of outer link plates and a plurality of inner link plates disposed inwardly of the outer link plates, a plurality of joint pins connecting the outer link plates and the inner link plates and coupling the link plate units in an endless loop pattern, and a plurality of power transmission blocks extending transversely across the link plates and supported by the inner link plates.

Since the power transmission blocks are supported by the inner link plates, the loads on the outer link plates closest to the end surfaces of the poewr transmission blocks can be reduced at the time the power transmission chain engages a sheave. Therefore, the power transmission chain has an increased service life or durability.

The above and further objects, details and advantages of the present invention will become apparent from the following description of a preferred embodiment thereof, when read in conjunction with the accompanying drawings.

BRIEF DESCRIPTION OF THE DRAWINGS

FIG. 3 is a cross-sectional view taken along line III—III of FIG. 2;

FIG. 4 is a cross-sectional view taken along line IV—IV of FIG. 2; and

FIG. 5 is a cross-sectional view taken along line V—V of FIG. 2.

DETAILED DESCRIPTION OF THE PREFERRED EMBODIMENT

Figure 1:
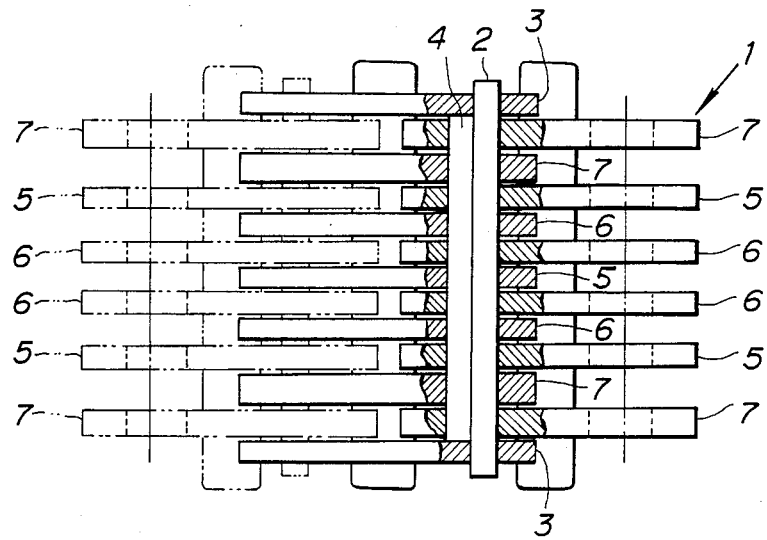
FIG. 1 is a fragmentary plan view, partly in cross section, of a power transmission chain according to the present invention.

As shown in FIG. 1, a power transmission chain 1 according to the present invention includes a plurality of link plate units (only one shown) each comprising a pair of outer link plates 3 spaced transversely from each other, and first, second and third interleaved inner link plates 5, 6, 7 disposed between the outer link plates 3. The outer link plates 3 and the first, second and third inner link plates 5, 6, 7 are interconnected by means of joint pins 2. The link plate units are joined in an endless loop pattern. The first, second and third inner link plates 5, 6, 7 are also coupled together by rocker pins 4 (FIGS. 1 and 5) adjacent to the joint pins 2.

Figure 2:
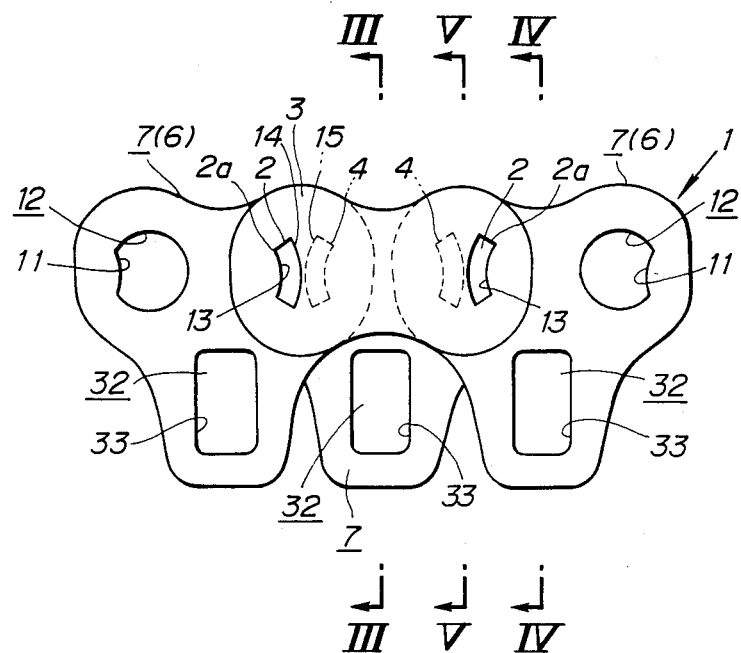
FIG. 2 is a side elevational view of the power transmission chain shown in FIG. 1.

In FIG. 2, each of the inner link plates 5, 6, 7 has a pin insertion hole 12 defined in one of two laterally spaced lobe-shaped portions, with a convex surface 11 projecting from one side into the pin insertion hole 12. The inner link plates 6, 7 have aprons or lugs 6b, 7b projecting downwardly (as shown in FIGS. 2 and 3) for supporting power transmission blocks (described later). The inner link plates 5, 6, 7 are interleaved such that they are partly overlapped. More specifically, one first inner link plate 5 is disposed transversely centrally of the link plate unit, and a pair of second inner link plates 6, 6 is positioned on each side of the central first inner link plate 5. On the outer side of each pair of the second inner link plates 6, 6, there is positioned another single second inner link plate 6 which is located inwardly of a pair of first inner link plates 5, 5. This pair of first inner link plates 5, 5 is positioned inwardly of one third inner link plate 7 that is juxtaposed to a pair of other third inner link plates 7, 7 disposed inwardly of one of the outer link plates 3. The outer link plates 3, 3 are of a double-lobed shape, while the inner link plates 5, 6, 7 are of a substantially triangular shape, as shown in FIGS. 1 and 2.

As illustrated in FIG. 2, each of the joint and rocker pins 2, 4 has an elongate arcuate cross section, and the paired joint and rocker pins 2, 4 are positioned with their respective convex sides 14, 15 facing each other. Each rocker pin 4 extends through the pin insertion holes 12 in the inner link plates 5, 6, 7, while each joint pin 2 extends through the pin insertion holes 12 in the inner link plates 5, 6, 7 and has opposite ends inserted through pin insertion holes 13 defined in the outer link plates 3, 3. The pin insertion holes 12 in the inner link plates 5, 6, 7 are of a substantially circular shape which is slightly recessed by the convex surface 11. Each pin insertion hole 13 in the outer link plate 3 is of a shape complementary to the cross-sectional shape of the joint pin 2.

The power transmission blocks, denoted at 32, have end surfaces 31, 31 (FIG. 3) engageable with the opposite surfaces 22, 22 of a V-shaped groove in a pulley or sheave 21. The power transmission blocks 32 are force-fitted in block supporting holes 33 (FIG. 2) defined in the aprons 6b, 7b of the inner link plates 6, 7. Therefore, the power transmission blocks 32 extending transversely through the inner link plates 6, 7 are supported solely by by block supporting holes 33.

The outer link plates 3, 3 located at outermost positions do not support the power transmission blocks 32, but support the joint pins 2 only. The power transmission blocks 32 are supported by the inner link plates 6, 7 located inwardly of the outer link plates 3. As illustrated in FIG. 3, the distance $L_2$ between the end surface 31 of the power transmission block and the central plane of the link plate 7 supporting the power transmission block 32 most closely to the end surface 31 is selected to be larger than the distance $L_1$ between the end surface 31 and the central plane of the outer link plate 3 which would otherwise support the power transmission block 32.

With the arrangement of the present invention, the distance $L_2$ between the end surface 31 and the central plane of the link plate 7 supporting the power transmission block 32 most closely to the end surface 31 is so large as to allow the power transmission block 32 to flex to a large extent upon engagement with the sheave 21. The large flexing ability of the power transmission block 32 at its portions outward of the outermost link plates 7 is effective in reducing the load imposed on the outermost link plates 7 which support the power transmission blocks 32 closest to the end surfaces 31. Therefore, the edges 2a of the joint pins 2 are prevented from being subject to localized stresses or stress concentration, with the result that the power transmission chain 1 will have an increased degree of durability.

When the end surfaces 31 of the power transmission block 32 engage the sheave 21, the third inner link plates 7 supporting the power transmission block 32 near the end surfaces 31 suffer from larger loads applied by the power transmission block 32 than the loads imposed on the second inner link plates 6 supporting the power transmission block 32 inwardly of the third inner link plates 7. To prevent the inner link plates 6, 7 from being subject to different loads or stresses, or to allow these inner link plates 6, 7 to be stressed uniformly, the thickness $t_1$ of the third inner link plates 7 is larger than the thickness $t_2$ of the second inner link plates 6.

According to the present invention, upon engagement with the sheave 21, the loads applied from the power transmission block 32 on the third inner link plates 7, 7 and the second inner link plates 6, 6 are distributed, and stress concentration on the link plates 7 only is avoided to thereby increase the durability of the chain 1.

Since the thickness $t_1$ of the third inner link plates 7 is larger than the thickness $t_2$ of the second inner link plates 6, the second and third inner link plates 6, 7 are uniformly stressed for greater chain durability, regardless of the fact that, when the end surfaces 31 engage the sheave 21, the third inner link plates 7 supporting the power transmission block 32 near the end surfaces 31 suffer from larger loads than the loads imposed on the second inner link plates 6 supporting the power transmission block 32 inwardly of the third inner link plates 7.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A power transmission chain comprising:
   a plurality of link plate units each composed of a pair of outer link plates and a plurality of inner link plates disposed inwardly of said outer link plates;
   a plurality of joint pins connecting said outer link plates and said inner link plates and coupling said link plate units in an endless loop pattern; and
   a plurality of power transmission blocks extending transversely through said inner link plates only so as to be supported therein.

2. A power transmission chain comprising;
   a plurality of link plate units each composed of a pair of outer link plates and a plurality of inner link plates disposed inwardly of said outer link plates;
   a plurality of joint pins connecting said outer link plates and said inner link plates and coupling said link plate units in an endless loop pattern; and
   a plurality of power transmission blocks extending transversely through said inner link plates only so as to be supported therein, each of said power transmission blocks having opposite end surfaces engageable in a groove in a sheave, one pair of inner link plates supporting each of said power transmission blocks in the vicinity of said opposite end surfaces thereof, and the remaining inner link plates disposed between said one pair of inner link plates supporting said each power transmission block at a portion thereof inward of said opposite end surfaces.

3. A power transmission chain according to claim 2, wherein each of said inner link plates supporting said each power transmission block in the vicinity of the opposite end surfaces has a thickness larger than the thickness of said other inner link plates supporting said each power transmission block at its portion inward of said opposite end surfaces.

4. A power transmission chain according to claim 1 or 2, further including a plurality of rocker pins connecting only said inner link plates.

5. A power transmission chain according to claim 4, wherein said joint and rocker pins are of an elongate arcuate cross section and have convex surfaces facing each other.

6. A power transmission chain according to claim 4, wherein said outer link plates have pin insertion holes through which said joint pins extend, and said inner link plates having pin insertion holes through which said joint and rocker pins extend.

7. A power transmission chain according to claim 4, wherein said pin insertion holes in said outer link plates have a cross-sectional shape complementary to the cross-sectional shape of said joint pins, and said pin insertion holes in said inner link plates have a recessed circular shape.

8. A power transmission chain according to claim 1 or 2, wherein each of said outer link plates is of a double-lobed shape.

9. A power transmission chain according to claim 8, wherein:
   each of said inner link plates is of a substantially triangular shape.

10. A power transmission chain according to claim 1 or 2, wherein said inner link plates have block supporting holes in which said power transmission blocks are fixedly supported.

* * * * *

UNITED STATES PATENT AND TRADEMARK OFFICE
CERTIFICATE OF CORRECTION

PATENT NO. : 4,643,704

DATED : February 17, 1987

INVENTOR(S) : Shoichi HONDA

It is certified that error appears in the above-identified patent and that said Letters Patent are hereby corrected as shown below:

Abstract, line 4, after "joint" change "plates" to --pins--.
Column 1, line 46, change "poewr" to --power--.
Column 2, line 35, after "plates 3" (first occurrence)
    insert --, 3--.
Column 2, line 62, delete "by" (one occurrence).
Claim 3, line 5, (column 4, line 33), change "other" to
    --remaining--.

Signed and Sealed this

First Day of September, 1987

*Attest:*

DONALD J. QUIGG

*Attesting Officer*    *Commissioner of Patents and Trademarks*